(12) United States Patent
A et al.

(10) Patent No.: US 11,405,260 B2
(45) Date of Patent: Aug. 2, 2022

(54) NETWORK MODEL AWARE DIAGNOSIS OF A NETWORK

(71) Applicant: Juniper Networks, Inc., Sunnyvale, CA (US)

(72) Inventors: Chandrasekhar A, Bangalore (IN); Jayanthi R, Coimbatore (IN); Javier Antich, Valencia (ES); Patricio Giecco, Upland, CA (US); Hitesh Mali, Cherry Hill, ND (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/731,372

(22) Filed: Dec. 31, 2019

(65) Prior Publication Data

US 2021/0152416 A1  May 20, 2021

(30) Foreign Application Priority Data

Nov. 18, 2019  (IN) .............................. 201941046895

(51) Int. Cl.
*H04L 12/24* (2006.01)
*H04L 41/0631* (2022.01)
(Continued)

(52) U.S. Cl.
CPC ........ *H04L 41/0631* (2013.01); *H04L 41/069* (2013.01); *H04L 41/0654* (2013.01); *H04L 41/12* (2013.01); *H04L 43/0817* (2013.01)

(58) Field of Classification Search
None
See application file for complete search history.

(56) References Cited

U.S. PATENT DOCUMENTS 6,336,138 B1  1/2002 Caswell et al.
7,552,447 B2  6/2009 Uthe
(Continued)

FOREIGN PATENT DOCUMENTS

EP  2961100 A1  12/2015
WO  2013/055760 A1  4/2013

OTHER PUBLICATIONS

J. M. Sánchez, I. G. Ben Yahia and N. Crespi, "Self-modeling based diagnosis of services over programmable networks," 2016 IEEE NetSoft Conference and Workshops (NetSoft), Seoul, Korea (South), 2016, pp. 277-285, doi: 10.1109/NETSOFT.2016.7502423. Jun. 2016.*

(Continued)

*Primary Examiner* — Natisha D Cox
(74) *Attorney, Agent, or Firm* — Shumaker & Sieffert, P.A.

(57) ABSTRACT

Management of network devices using network aware diagnosis techniques. An example method to monitor a network includes constructing, by a controller device that manages a plurality of network devices, a deployed graph model comprising a plurality of models representative of services operating on the network devices within the network. The method also includes receiving an alert, by the controller device, that a service operating on one of the network devices is experiencing a failure. Additionally, the method includes traversing, by the controller device, modeled dependencies within the deployed graph model to perform root cause analysis of the service that is experiencing the failure to determine a resource-level event causing the failure. The method includes. based on the traversing, providing, by the controller device, a report indicating the root cause of the failure.

19 Claims, 7 Drawing Sheets

(51) Int. Cl.
*H04L 41/069* (2022.01)
*H04L 41/0654* (2022.01)
*H04L 41/12* (2022.01)
*H04L 43/0817* (2022.01)

(56) References Cited

U.S. PATENT DOCUMENTS

| | | | | |
|---|---|---|---|---|
| 7,865,888 | B1* | 1/2011 | Qureshi | G06F 11/079 717/168 |
| 10,187,260 | B1* | 1/2019 | Chen | G06F 9/45558 |
| 10,516,761 | B1 | 12/2019 | A et al. | |
| 2002/0022952 | A1 | 2/2002 | Zager et al. | |
| 2004/0049372 | A1* | 3/2004 | Keller | H04L 41/06 703/22 |
| 2004/0049565 | A1* | 3/2004 | Keller | G06F 11/0709 709/223 |
| 2004/0268335 | A1 | 12/2004 | Martin et al. | |
| 2005/0262106 | A1 | 11/2005 | Enqvist | |
| 2008/0021918 | A1 | 1/2008 | Rao | |
| 2008/0222287 | A1 | 9/2008 | Bahl et al. | |
| 2011/0154367 | A1 | 6/2011 | Gutjahr et al. | |
| 2011/0231704 | A1 | 9/2011 | Ge et al. | |
| 2012/0222745 | A1* | 9/2012 | Kolarsky | B60T 13/57 137/1 |
| 2013/0339515 | A1 | 12/2013 | Radhakrishnan | |
| 2014/0222745 | A1* | 8/2014 | Deng | G06Q 10/00 706/47 |
| 2015/0199226 | A1 | 7/2015 | Wu et al. | |
| 2017/0075749 | A1 | 3/2017 | Ambichl et al. | |
| 2017/0102997 | A1 | 4/2017 | Purushothaman et al. | |
| 2017/0279687 | A1 | 9/2017 | Muntes-Mulero et al. | |
| 2017/0288940 | A1 | 10/2017 | Lagos et al. | |
| 2017/0372212 | A1 | 12/2017 | Zasadzinski et al. | |
| 2019/0081850 | A1 | 3/2019 | Nazar et al. | |
| 2019/0165988 | A1 | 5/2019 | Wang et al. | |
| 2021/0026723 | A1 | 1/2021 | Nadger et al. | |
| 2021/0271522 | A1 | 9/2021 | Butterworth et al. | |

OTHER PUBLICATIONS

Extended Search Report from counterpart European Application No. 20164948.0, dated Aug. 20, 2020, 10 pp.

U.S. Appl. No. 16/946,994, filed Jul. 14, 2020, naming inventors Jayanthi et al.

Bjorklund, "YANG—A Data Modeling Language for the Network Configuration Protocol (NETCONF)," Internet Engineering Task Force (IETF), RFC 6020, Oct. 2010, 173 pp.

U.S. Appl. No. 16/821,745, filed Mar. 17, 2020, naming inventors Jayanthi et al.

Schoenwaelder, J. "Common YANG Data Types" Internet Engineering Task Force (IETF), RFC 6991, Jul. 2013, 30 pp.

Clemm et al. "A YANG Data Model for Network Topologies" Internet Engineering Task Force (IETF) RFC 8345, Mar. 2018, 57 pp.

Harrington et al., "An Architecture for Describing Simple Network Management Protocol (SNMP) Management Frameworks," RFC 3411, Network Working Group, Internet Engineering Task Force (IETF), Dec. 2002, 64 pp.

Bahl et al., "Towards Highly Reliable Enterprise Network Services Via Inference of Multi-level Dependencies," ACM SIGCOMM Computer Communication Review, Aug. 27-31, 2007, pp. 13-24.

Gruschke, "Integrated event management: Event correlation using dependency graphs," In Proceedings of the 9th IFIP/IEEE International Workshop on Distributed Systems: Operations & Management (DSOM 98). Oct. 1998, 12 pp.

Huang et al., "Performance Diagnosis for SOA on Hybrid Cloud Using the Markov Network Model," 2013 IEEE 6th International Conference on Service-Oriented Computing and Applications, Koloa, Hawaii, Dec. 16-18, 2013, pp. 17-24.

Steinder et al., "A survey of fault localization techniques in computer networks," Science Direct, Science of Computer Programming, vol. 53, Issue 2, Nov. 2004, pp. 165-194.

U.S. Appl. No. 17/652,096, filed Feb. 22, 2022, naming inventors R. et al.

Yan et al., "G-RCA: A Generic Root Cause Analysis Platform for Service Quality Management in Large IP Networks" IEEE/ACM Transactions on Networking; vol. 20, Issue: 6, Dec. 2012, pp. 1734-1747.

\* cited by examiner

NETWORK MODEL AWARE DIAGNOSIS OF A NETWORK

This application claims benefit of priority from Indian Provisional Application No. 201941046895, filed Nov. 18, 2019, which is incorporated herein by reference in its entirety.

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred to herein as a controller device, may configure network devices using low-level (that is, device-level) configuration data, e.g., expressed in Yet Another Next Generation (YANG) data modeling language. Moreover, the controller device may manage the network devices based on the configuration data for the network devices. According to the techniques of this disclosure, a network model definition, using both model traversing techniques and dependency graph techniques, that captures both network models and device models, corresponding telemetry rules, and dependent relations between nodes, services, and/or multi-layer services. A network diagnosis service, when identifying the root cause of a failure, (i) performs node-level root cause analysis that groups resources that are related and checks if the related resources have cause and effect relationships between the events of the related resources, (ii) service-level root cause analysis that applies (a) link-based cause and effect dependencies, (b) then service-to-node event dependencies, and (c) then dependencies across service events, and (iii) multi-layer RCA that gathers service-to-service cause and effect event dependencies to be traversed in layered order. Based on these gathered relationships, the network diagnosis service navigates the events and identifies the source of the problem.

In one example, a method to monitor a network includes constructing, by a controller device that manages a plurality of network devices, a deployed graph model comprising a plurality of models representative of services operating on the network devices within the network. The method also includes receiving an alert, by the controller device, that a service operating on one of the network devices is experiencing a failure. Additionally, the method includes traversing, by the controller device, modeled dependencies within the deployed graph model to perform root cause analysis of the service that is experiencing the failure to determine a resource-level event causing the failure. The method includes, based on the traversing, providing, by the controller device, a report indicating the root cause of the failure.

An example controller device that manages a plurality of network devices includes one or more processing units implemented in circuitry. The controller device constructs a deployed graph model comprising a plurality of models representative of services operating on the network devices within the network. The controller device also receives an alert that a service operating on one of the network devices is experiencing a failure. The controller device traverses modeled dependencies within the deployed graph model to perform root cause analysis of the service that is experiencing the failure to determine a resource-level event causing the failure. Additionally, the controller device, based on the traversing, provide a report indicating the root cause of the failure.

An example controller device manages a plurality of network devices. The controller device includes one or more processing units implemented in circuitry. The controller device a deployed graph model that includes modeled dependencies between the network devices, services operating on the network devices, and multi-layer services. The controller device multiple failures of one or more of the services operating on the network devices. The controller device traverses the modeled dependencies within the deployed graph model to perform root cause analysis. Based on the traversing, the controller device provides a report indicating the root causes of the failures.

The details of one or more examples are set forth in the accompanying drawings and the description below. Other features, objects, and advantages will be apparent from the description and drawings, and from the claims.

DETAILED DESCRIPTION

Figure 1:
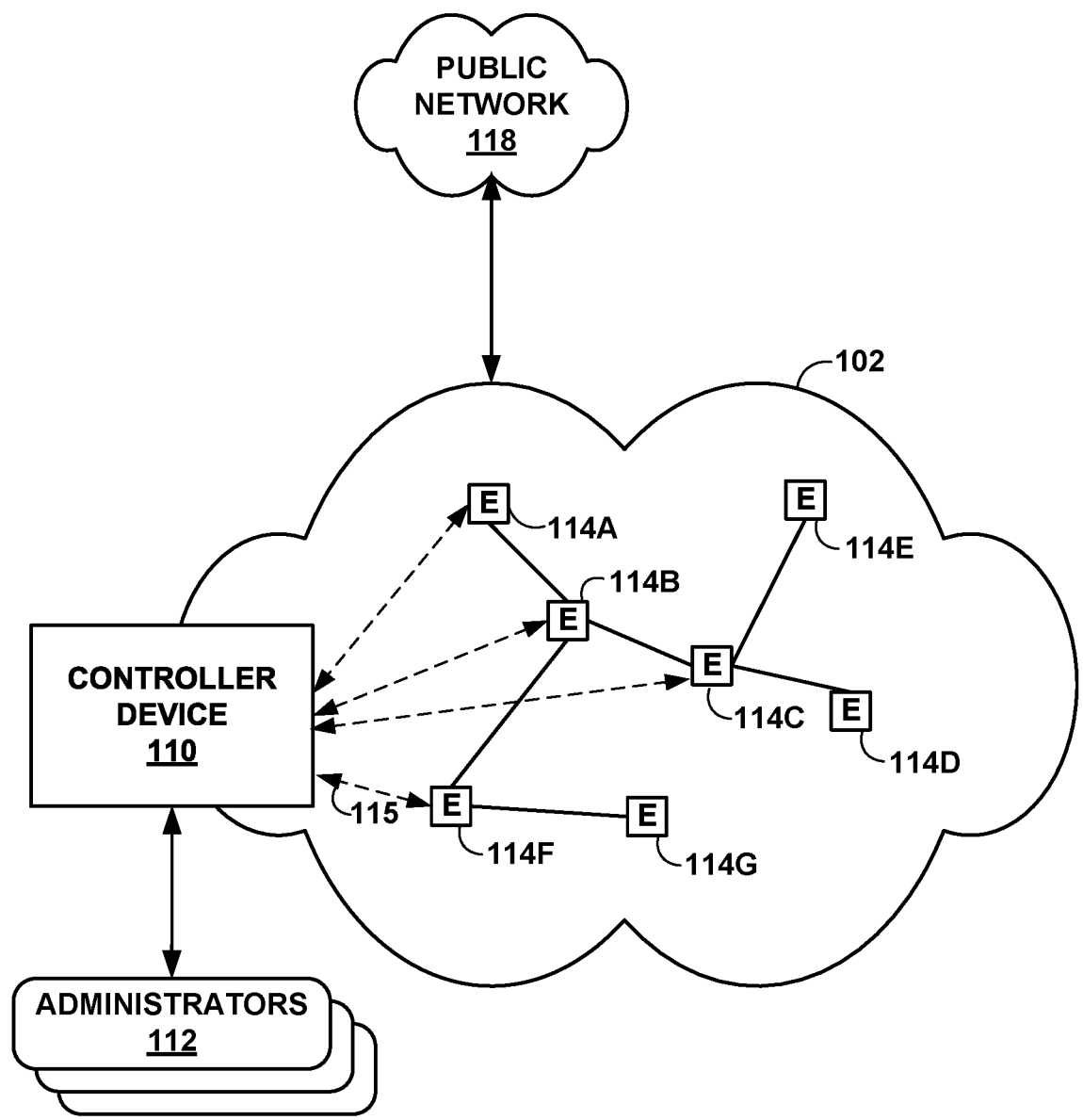
FIG. 1 is a block diagram illustrating an example including elements of an enterprise network that are managed using a management device.

Fault diagnosis (sometimes referred to as "root cause analysis" or "RCA") is a process to identify the root cause of a network component failure from a set of events that are generated in a time window. Fault diagnosis is a critical task for operators to maintain a properly functioning network. A few possible techniques to perform RCA include a model traversing technique and a dependency graph technique.

The model traversing technique uses object models to determine fault propagation. The network is represented with various components and relationships between the components. Based on this model, fault dependencies can be inferred and used to identify the root cause of an issue. Model traversing techniques do not specify fault dependencies directly, but rather derive them from the model during run-time. These techniques are suitable for a network that changes frequently. However, by themselves, model traversing techniques cannot deal with more complex fault propagation scenarios (e.g., assumes only one issue happens at a time). The dependency graph technique uses a directed graph to model dependencies between the object events. Nodes represent network elements (e.g., hosts). An edge from node A:event to node B:event indicates that the failures in node A can cause failures in node B. Dependency graphs are often used in networks with infrequent changes. In networks with frequent changes, the dependencies need to be updated frequently. Networks are complex. For example, one networks can be overlaid on top of another network. For example, virtual private networks (VPNs) are overlaid on internet protocol (IP) networks that use it as a transport layer. Networks need a mechanism to correlate the issues across layers with a generic model driven solution that can be applied to any network and service topology that can support networks with frequent changes and support multiple concurrent faults at a time.

As described below, the Network Model Aware Diagnosis technique of the present disclosure uses element models, service models, and multi-layer models. The element model accounts for network devices that uses various resources (e.g., a packet forwarding engine (PFE), a line card, interfaces, chassis, CPUs, etc.) and captures the relationships between these resources. Dependencies between the various events across the resources are captured. The service model accounts for services spread across the devices (e.g., layer-3 (L3) VPN/virtual private LAN services (VPLS), label-switched path (LSP) tunnels, etc.). The service model comprises various events capture at the service level. The service model captures (i) service and service endpoint associations, (ii) connectivity link (path) between various endpoint (e.g., a VPN service with endpoints Node A, B, C contains a tunnel between Node A and Node B and a tunnel between Node A and Node C, etc.), (iii) dependencies across service events, (iv) dependencies across the endpoint events, and (v) dependency between device event to service event. Networks are layered. As a result, a broken link in the underlying layer or any other problem in the lower layer services cause many higher layer services to fail, even when these services are not directly connected to the failing components. The multi-layer model captures (service to service dependencies, (ii) service link to service link dependencies, and (iii) dependencies across service events. As described below, the Network Aware Diagnosis technique includes both a network model and a device model. The network model definition includes services and service endpoints, and captures service-to-service dependencies and service-to-device resource associations.

FIG. 1 is a block diagram illustrating an example including elements of an enterprise network 102 that are managed using a controller device 110. Managed elements 114A-114G (collectively, "elements 114") of the enterprise network 102 include network devices interconnected via communication links to form a communication topology in order to exchange resources and information. The elements 114

(also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, the enterprise network 102 may transmit data according to any other discrete data unit defined by any other protocol, such as a cell defined by the Asynchronous Transfer Mode (ATM) protocol, or a datagram defined by the User Datagram Protocol (UDP). Communication links interconnecting the elements 114 may be physical links (e.g., optical, copper, and the like), wireless, or any combination thereof.

The enterprise network 102 is shown coupled to a public network 118 (e.g., the Internet) via a communication link. The public network 18 may include, for example, one or more client computing devices. The public network 18 may provide access to web servers, application servers, public databases, media servers, end-user devices, and other types of network resource devices and content.

The controller device 110 is communicatively coupled to the elements 114 via the enterprise network 102. The controller device 110, in some examples, forms part of a device management system, although only one device of the device management system is illustrated for purpose of example in FIG. 1. The controller device 110 may be coupled either directly or indirectly to the various elements 114. Once the elements 114 are deployed and activated, administrators 112 uses the controller device 110 (or multiple such management devices) to manage the network devices using a device management protocol. One example device protocol is the Simple Network Management Protocol (SNMP) that allows the controller device 110 to traverse and modify management information bases (MIBs) that store configuration data within each of the managed elements 114. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, the controller device 110, also referred to as a network management system (NMS) or NMS device, and the elements 114 are centrally maintained by an IT group of the enterprise. The administrators 112 interact with the controller device 110 to remotely monitor and configure the elements 114. For example, the administrators 112 may receive alerts from the controller device 110 regarding any of the elements 114, view configuration data of the elements 114, modify the configurations data of the elements 114, add new network devices to the enterprise network 102, remove existing network devices from the enterprise network 102, or otherwise manipulate the enterprise network 102 and network devices therein. Although described with respect to an enterprise network, the techniques of this disclosure are applicable to other network types, public and private, including LANs, VLANs, VPNs, and the like.

In some examples, the administrators 112 uses controller device 10 or a local workstation to interact directly with the elements 114, e.g., through telnet, secure shell (SSH), or other such communication sessions. That is, the elements 114 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 115 with one of the elements 114, e.g., element 14F, using the controller device 110, to directly configure element 14F. In this manner, a user can provide commands in a format for execution directly to the elements 114.

Further, the administrators 112 can also create scripts that can be submitted by the controller device 110 to any or all of the elements 114. For example, in addition to a CLI interface, the elements 114 also provide interfaces for receiving scripts that specify the commands in accordance with a scripting language. In a sense, the scripts may be output by the controller device 110 to automatically invoke corresponding remote procedure calls (RPCs) on the managed the elements 114. The scripts may conform to, e.g., extensible markup language (XML) or another data description language.

The administrators 112 use the controller device 110 to configure the elements 114 to specify certain operational characteristics that further the objectives of the administrators 112. For example, the administrators 112 may specify for an element 114 a particular operational policy regarding security, device accessibility, traffic engineering, quality of service (QoS), network address translation (NAT), packet filtering, packet forwarding, rate limiting, or other policies. The controller device 110 uses one or more network management protocols designed for management of configuration data within the managed network elements 114, such as the SNMP protocol or the Network Configuration Protocol (NETCONF) protocol, or a derivative thereof, such as the Juniper Device Management Interface, to perform the configuration. The controller device 10 may establish NETCONF sessions with one or more of the elements 114.

Controller device 110 may be configured to compare a new intent data model to an existing (or old) intent data model, determine differences between the new and existing intent data models, and apply the reactive mappers to the differences between the new and old intent data models. In particular, the controller device 110 determines whether the new data model includes any additional configuration parameters relative to the old intent data model, as well as whether the new data model modifies or omits any configuration parameters that were included in the old intent data model.

The intent data model may be a unified graph model, while the low-level configuration data may be expressed in YANG, which is described in (i) Bjorklund, "YANG—A Data Modeling Language for the Network Configuration Protocol (NETCONF)," Internet Engineering Task Force, RFC 6020, October 2010, available at tools.ietf.org/html/rfc6020, and (ii) Clemm et al., "A YANG Data Model for Network Topologies," Internet Engineering Task Force, RFC 8345, March 2018, available at tools.ietf.org/html/rfc8345 (sometimes referred to as "RFC 8345"). In some examples, the intent data model may be expressed in YAML Ain't Markup Language (YAML). Controller device 10 may include various reactive mappers for translating the intent data model differences. These functions are configured to accept the intent data model (which may be expressed as structured input parameters, e.g., according to YANG or YAML). The functions are also configured to output respective sets of low-level device configuration data model changes, e.g., device configuration additions and removals. That is, y1=f1(x), y2=f2(x), . . . yN=fN(x).

The controller device 110 may use YANG modeling for intent data model and low-level device configuration models. This data may contain relations across YANG entities, such as list items and containers. As discussed in greater detail below, the controller device 110 may convert a YANG data model into a graph data model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

The controller device 110 may receive data from one of the administrators 112 representing any or all of create, update, and/or delete actions with respect to the unified intent data model. The controller device 110 may be configured to use the same compilation logic for each of create, update, and delete as applied to the graph model.

In general, controllers, like the controller device 110, use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, the controller device 110 attempts to select optimal resources.

Figure 2:
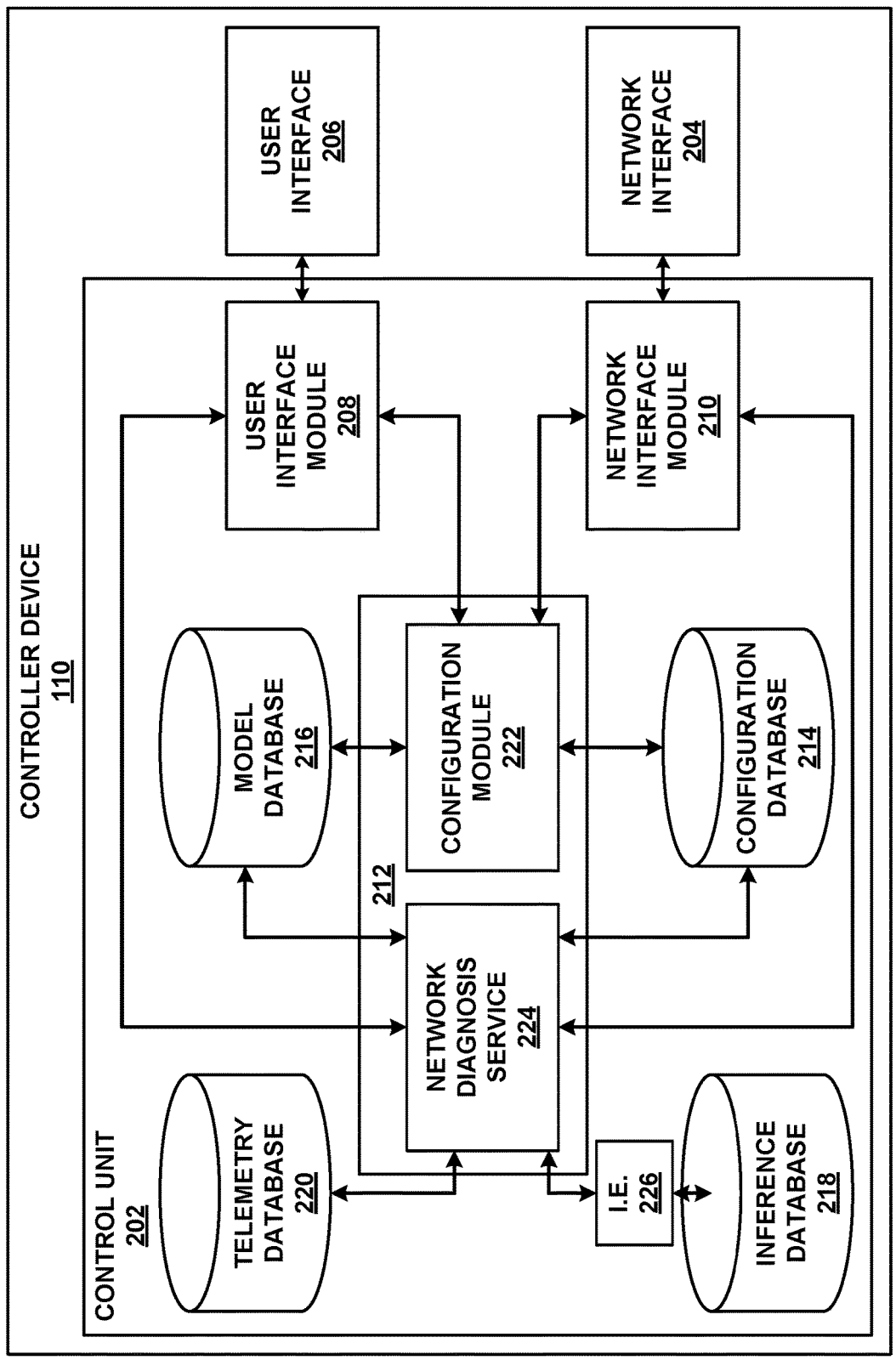
FIG. 2 is a block diagram illustrating an example set of components for the management device of FIG. 1.

The controller device 110 includes a network diagnosis service with a network aware diagnosis process to facilitate root cause analysis (RCA) when one or more of the network elements 114 fail. An example network diagnosis service is illustrated in FIG. 2. The network aware diagnosis model includes an inventory model, a service model, a network model, a multi-layer service model, and/or a diagnosis model that capture the resources (e.g., the elements 114 and the services that run on the elements 114, etc.) and the cause and effect between resources defined in the inventory model, the service model, the network model, and the multi-layer service model. The network aware diagnosis process performs device level RCA, service level RCA, and multi-layer service RCA. For device level RCA, to identify the root cause, the controller device 110 groups the resources that are related and determines whether the related resources have a cause and effect relation between the events. Based on the determined cause and effect relationships, the controller device 110 navigates to the events based on the model and identifies the source of the problem. For service level RCA, services have a set of nodes and links. Event dependencies capture (i) the cause and effect between service events and service to node events and (ii) cause and effect relation between device events within a service endpoint context (sometimes referred to as "link-based events."). For example, source.interface congestion can cause destination.interface-.packet loss within VPN endpoints, network device A and network device B (where the source is network device A and the destination is network device B). To identify the root cause, the controller device 110 applies device level cause and effect event dependencies, then applies link-based cause and effect dependencies, then applies service to node event dependencies, and then applies dependencies across service events. For multi-layer service RCA, the source of a failure is identified based on layered order using service to service cause and effect event dependencies.

FIG. 2 is a block diagram illustrating an example set of components for the controller device 110 of FIG. 1. In this example, the controller device 110 includes a control unit 202, network interface 204, and user interface 206. The network interface 204 represents an example interface that can communicatively couple the controller device 100 to an external device, e.g., one of the elements 114 of FIG. 1. The network interface 204 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). The controller device 100 may include multiple network interfaces in various examples, although only one network interface is illustrated for purposes of example.

The control unit 202 represents any combination of hardware, software, and/or firmware for implementing the functionality attributed to the control unit 202 and its constituent modules and elements. When the control unit 202 includes software or firmware, the control unit 202 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 206 represents one or more interfaces by which a user, such as the administrators 112 of FIG. 1, interacts with the controller device 110, e.g., to provide input and receive output. For example, the user interface 206 may represent one or more of a monitor, keyboard, mouse, touchscreen, touchpad, trackpad, speakers, camera, microphone, or the like. Furthermore, although in this example the controller device 100 includes a user interface 206, the administrators 112 need not directly interact with the controller device 100, but instead may access the controller device 100 remotely, e.g., via the network interface 204.

Functionality of the control unit 202 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, the control unit 202 may further include one or more computer readable storage media storing hardware or firmware instructions to be executed by processing unit(s) of the control unit 202.

In this example, the control unit 202 includes a user interface module 208, a network interface module 210, and management module 212. The control unit 202 executes user interface module 208 to receive input from and/or provide output to the user interface 206. The control unit 202 also executes the network interface module 210 to send and receive data (e.g., packets) via the network interface 204. The user interface module 208, the network interface module 210, and the management module 212 may again be implemented as respective hardware units, or in software or firmware, or a combination thereof.

The control unit 202 executes a management module 212 to manage various network devices, e.g., the elements 114 of FIG. 1. Management includes, for example, configuring the network devices according to instructions received from a user (e.g., the administrators 112 of FIG. 1) and providing the user with the ability to submit instructions to configure the network devices. The management module 212 accesses various databases, such as a configuration database 214, a model database 216, an inference database 218 and a telemetry database 220, that store data to assist in managing the various network devices. While the databases 214-220 are illustrated as separate databases, one or more of these databases 214-220 may be combined or otherwise rearranged. In this example, the management module 212 further includes a configuration module 222 and network diagnosis service 224.

The management module 212 is configured to receive intent unified-graph-modeled configuration data for a set of managed network devices from a user, such as the administrators 112. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B."

The configuration database 214 generally includes information describing the managed network devices, e.g., the elements 114. The configuration database 214 may include information indicating device identifiers (such as MAC and/or IP addresses), device type, device vendor, devices species (e.g., router, switch, bridge, hub, etc.), or the like. The configuration database 214 also stores current configuration information (e.g., intent data model, or in some cases, both intent data model and low-level configuration information) for the managed devices (e.g., the elements 114).

The model database 216 includes the models configured by a user, via the configuration module 222, that describe the structure of the network 102. As described below, the model database 216 includes a network aware diagnosis model that is used by the network diagnosis service 224 to perform root cause analysis to find the malfunctioning element 114 that is a source of an event even when the malfunction is not the direct cause of the event.

Figure 3:
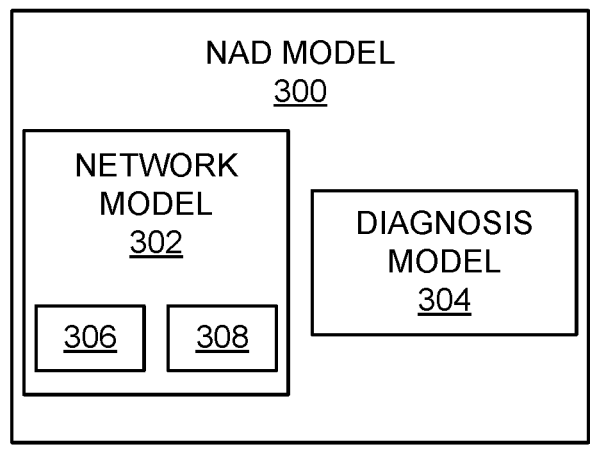
FIG. 3 is conceptual diagram illustrating components of an example network aware diagnosis (NAD) model, which may be implemented by a controller device, such as the controller device of FIGS. 1 and 2

FIG. 3 is conceptual diagram illustrating components of an example network aware diagnosis (NAD) model 300, which may be implemented by a controller device, such as the controller device 10. The NAD model 300 models the network from multiple perspectives to be usable with networks that frequently change and support multiple concurrent faults at a time. In the illustrated example, the NAD model 300 includes network model 302 and a diagnosis model 304. The network model 302 is configurable to be applied to any network and service topology. The network model 302 is augmentable for network specific information, but still adhere to the same structure, so that RCA infrastructure is handle in consistent way.

The NAD model 300 is used by the network diagnosis service 224 to perform node-level RCA and service-level RCA. When identifying the root cause, the node-level RCA groups resources that are related and check if the related resources have cause and effect relationships between the events of the related resources. For the service-level RCA, the NAD model 300 applies link-based cause and effect dependencies, then service-to-node event dependencies, and then dependencies across service events. For the multi-layer RCA, the NAD model 300 gathers service-to-service cause and effect event dependencies to be traversed in layered order. Based on these relationships, the NAD model 300 navigates the events and identifies the source of the problem.

The NAD model 300 includes both a network model 306 and a device model 308 (sometimes referred as an "element model"). The definition of the network model 306 includes (i) services and service endpoints, and (ii) captures service-to-service dependencies and service-to-device resource associations. The network model 306 includes also includes service-to-service dependencies and service-to-device resource associations across layers in the network. The definition of the device model 308 captures various objects in devices (e.g., interfaces, virtual routing and forwarding (VRF), chassis, field-replaceable units (FRUs), etc.) (sometimes referred to as "nodes"). Some objects may have a configuration. Each object has state attributes. The models 306 and 308 also capture dependencies across resources. The dependencies are parsed and persisted in the model database 216. Application programmable interfaces (APIs) provide methods to add new model definitions and dependencies across these models using the configuration module 222.

Figure 4:
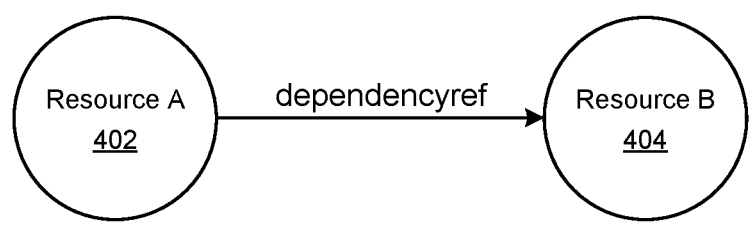
FIG. 4 is conceptual diagram illustrating a data structure to link two resources together.

FIG. 4 is conceptual diagram illustrating a data structure to link two resources together. In some examples, the YANG Data type "dependencyref" is used to reference a particular resource in the data tree. The "dependencyref" defines a dependency between two resources (e.g., resource A 402 and resource B 404 of FIG. 4.) The "path" substatement selects a set of list key instances, and the ref value space is the set of values of these list key instances. If the leaf with the dependencyref type represents configuration or inventory data that puts restraints on valid data, the leaf it refers to also represents configuration. Such a leaf puts a constraint on valid data. All dependencyref nodes reference existing list key instances when the data is valid. The following provides an example of using dependencyref to reference a particular resource in the data tree:

```
list interface {
    key "name";
    leaf name {
        type string;
    }
    leaf admin-status {
        type admin-status;
    }
    list address {
        key "ip";
        leaf ip {
            type yang:ip-address;
        }
    }
}
```

Consider the following leafref referring to an existing interface:

```
list VRF {
    type dependencyref {
        path "../interface/name";
    }
}
```

This would add following properties to Reffered resource:

```
leaf-list reffer-list {
    type string;
    description "A list of referred object path";
}
```

With the interface ge-0/0/1 resource and a department-vrf resource:

```
Interface {
    reffer-list ["VRF/ department-vrf"]
    name ge-0/0/1
}
```

The following is an example an example dependency-ref definition of the service model 306 based on RFC 8345 augmented by the teaching of this disclosure. The dependency-ref creates the reference edge between two resources. The referrer object contains the "ref" property and the referred object contains the "reffer-list" property. This is augmented by the device model 308. Inventory resources (e.g., devices, nodes, etc.) are referenceable in nodes, links and/or termination points in in network or network topology or service topology.

The device model 308 captures device inventory objects and reference of node resources in the topology. The device model 308 contains a set of resources. Resource objects contain a resource-id, a resource-type, a parent-resource-id (in case of hierarchical resources), and dependent-resource (a resource cane be supported by other resources and map onto one or more other resources in a node). The device model 308 facilitates applications to operate on an inventory of any network at a generic level, where the specifics of particular inventory are not required, and can be augmented with inventory-specific attributes. The following is an example of a resource object in YANG based on RFC 8345 augmented by the teaching of this disclosure.

```
module ieft-inventory {
    yang-verion 1.1;
    namespace "urn:ietf:params:xml:ns:yang:ietf-inventory";
    prefix nw;
    import ietf-inet-types {
        prefix inet;
        reference
            "RFC 6991: Common YANG Data Types";
    }
    organization
        "Working Group";
    description "This module defines a common base data model for a
        collection of resources in a node.";
```

```
Module: ietf-network
    +--rw networks
        +-- network* [network-id]
            +--rw network-id    network-id
            +--rw supporting-network* [network-ref]
            |    +--rw network-ref -> /networks/network/network-id
            +--rw node* [node-id]
                +--rw node-id        node-id
                +--rw supporting-node* [network-ref node-ref resource-ref]
                    +--rw network-ref
                    |        -> ../../../supporting-network/network/node/node-id
                    +--rw node-red     ->/networks/network/node/node-id
                    +--rw resource-ref    ->/networks/network/node/resource-id
module: ietf-network-topology
    augment /nw:networks/nw:network:
        +--rw link* [link-id]
        +--rw link-id        link-id
        +-- rouce
        | +--rw source-node?      -> ../../../nw:node/node-id
        | +--rw source-tp?        leafref
        +--rw resource-ref       -> /networks/network/node/resource-id
        +--rw destination
        | +--rw dest-node?        -> ../../../nw:node/node-id
        | +--dest-tp?       leafref
        +--rw resource-ref       -> /networks/network/node/resource-id
        +--rw supporting-link* [network-ref link-ref]
            +--rw network-ref
            |    -> ../../../nw:supporting-network/network-ref
            +-- link-refleafref
    augment /nw:networks/nw:network?nw:node
        +--rw termination-point* [tp-id]
            +--rw tp-id           tp-if
            +--rw supoorting-termination-point*
                    [network-ref node-ref tp-ref]
                +--rw network-ref
                |        -> ../../../nw:supporting-node/network-ref
                +--rw node-ref
                |        -> ../../../nw:supporting-node/node-ref
                +--rw tp-ref     leafref
                --rw resource-ref
                |        -> ../../../nw:supporting-node/node/resource-ref
```

```
        revisions 2018-02-26 {
            description
                "initial revision.";
        }
        typedef resource-id {
            type inet:uri;
            description
                "Identifier for a resource.";
        }
container resources {
    description
        "Serves as a top-level container for a list of inventory
        resources.";
    list resource {
        key "resource-id";
        description
            "Describes a resource. A node typically contains set of
            resources";
        leaf resource-id {
            type resource-id;
            description
                "Identifies a resource.";
        }
        leaf parent-resource-id {
            type resource-id;
            description
                "Identifies a resource.";
        }
        list dependent-resource {
            key "resource-ref";
            description
                "Represents another resource on the node..";
            leaf resource-ref {
                type dependencyref {
                    path
                    "../resource/resource-id";require-instance
                    false;
                }
            }
        }
    }
}
```

Figure 5A:
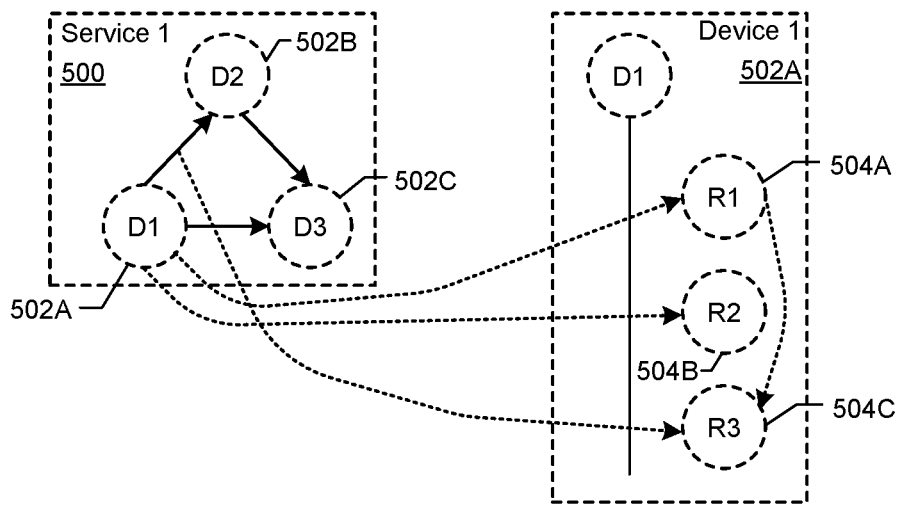
FIGS. 5A and 5B depict conceptual diagram illustrating example services, nodes, paths, and example service-node relationships.
Figure 5B:
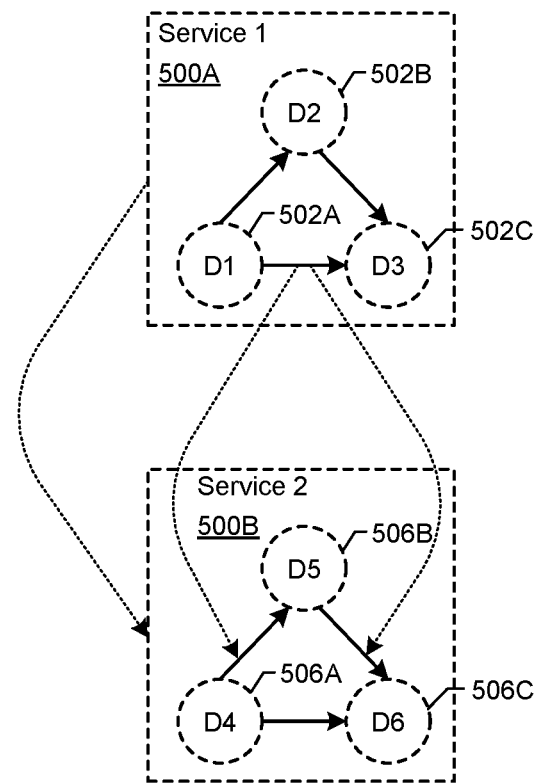

FIGS. 5A and 5B depict conceptual diagram illustrating example services, nodes, links, and example service-node relationships that may be modeled by the service model 306 and the device model 308. Additionally, FIG. 5B illustrates an example multi-layer service relationship that may be modeled in the service model 306. FIG. 5A shows a service ("Service 1") 500 that uses three devices ("D1," D2," and "D3") 502A-502C that are connected together over links to perform the service. In the illustrated example of FIG. 5A, D1 ("Device 1") 502A has three resources ("R1," R2," and "R3") 504A-504C. D1 502A has dependencies on R1 504A and R2 504B. R1 506A has a dependency on R3 504C. The link between D1 502A and D2 502B has a dependency on R3 504C. FIG. 5B shows a model with two services ("Service 1" and "Service 2") 500A and 500B. Service 1 500A on Layer 1 is dependent on Service 2 500B on Layer 2. Specifically, the link between D1 502A and D3 502C of Service 1 500A depends on the links between D4 506A and D5 506B and between D5 506B and D6 506C of Service 2 500B.

The diagnosis model 304 captures the cause and effect (sometimes referred to herein as "correlations") relationship between carious resources. The cause and effect relationship are defined between resources and resource alarms/events. When the cause and effect relationship is defined between resources, any critical alarm/event on a resource causes an effect on "supporting resources." When the cause and effect relationship is defined between resource alarms/events, an event on a resource causes an effect on a "supported resource" events.

For inventory resources, each resource object is augmented with alarms. An alarm defines operation state data on the device resource. The alarm contains several properties, including name, ID, and/or severity. Each resource object has stat attributes and state metadata. Cause and effects for the inventory resources capture the dependencies between event on supported resource such that device resource event→device resource event (e.g., PFE memory event→interface packet drops).

For service model and multi-layer cause and effect events, each network object is augmented with alarms. An alarm defines operation state data on the device resource. The alarm contains several properties, including name, ID, and/or severity. Each resource object has stat attributes and state metadata. The service model and multi-layer cause and effect events capture the cause and effect between events within services. In some examples, the cause and effect events may be service alarms, such that server event1→service event2 (e.g., VPN prefix-limit exceed→VPN-Route table limit). In some examples, the cause and effect events capture the alarm dependencies based on links between device resources, such that source <device resource event>→destination <device resource event> (e.g., source.Interface Congestion→destination.interface.packet loss). For multi-layer services, events on a network or service cause issue to other supported networks or services. These events are capture as event dependencies across the services, such that service.event1→service.event2 (e.g., LSP.interface congestion→VPN.latency). The following is an example of an alarm definition.

```
        module: ieft-inventory-alarms
            augment /nw:resources/nw:resources:
            +--rw Alarms* [alarm-id]
                +--rw alarm-id        alarm-id
                +- rw severity
```

The NAD model 300 uses various device level, service level, and multi-layer service correlations (e.g., causes and effects). Device level correlations are based on modeled dependencies within the device. These dependencies are navigated based on the device model 308 and are grouped with related events to identify the source(s) of problems in the diagnosis model 304. Service level correlations include service resource-to-device resource dependencies maintained in the network model 306. Based on these dependencies, service-to-device correlations are established and stored in the diagnosis model 304. Service level correlation uses the dependencies between services defined in the network model 306. The multi-layer services correlations establish causes and effects across layers and services. For example, an LSP event may cause an issue with the VPN. These cause-and-effect correlations are stored in the diagnosis model 304.

The inference databased 218 is a knowledge base that stores data and rules that are used by an inference engine 226 to generate an event in response to the root cause of an alerts. The event generated by the inference engine 226 may be used, for example, to recommend and/or take autonomous action based on remedial action recommendations stored in the telemetry database 220. For example, the root cause analysis of an alert regarding packet drops on an interface between the elements 114 may conclude that the alert was caused by a memory error in a packet forwarding engine of a router element. In such an example, the inference engine 226 may, based on information in the telemetry database 220, recommend a memory management technique for that element 114.

The network diagnosis service 224 performs root cause analysis in response to receiving an alert that a service, device, and/or link is not functioning within expected parameters. The network diagnosis service 224 uses the NAD model 300 to navigate through the network to determine which device or resource is the cause of the error. When an alert is received, the network diagnosis service 224 groups resources together based on dependencies of the service, device, and/or link associated with the alert. Using the NAM model 300, the network diagnosis service 224 navigates the dependencies until it reaches one or more resources.

Figure 6:
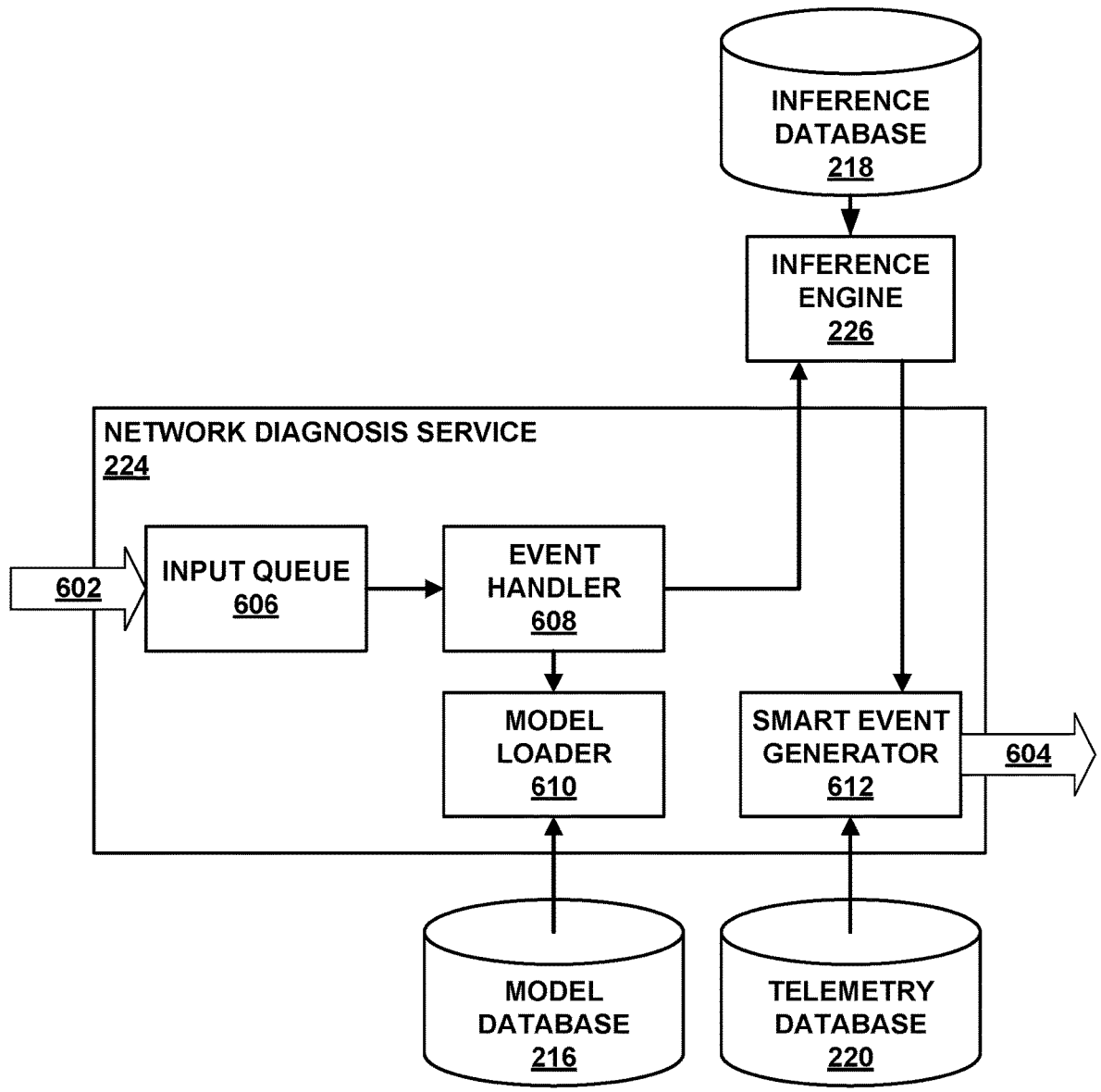
FIG. 6 is a block diagram illustrating an example network diagnosis service of FIG. 2.

FIG. 6 is a block diagram illustrating an example network diagnosis service 224 of FIG. 2. The network diagnosis service 224 receives an alert 602 that a resource is not functioning within expected parameters and outputs a smart event 604 that includes one or more root causes of the alert 602 and, in some examples, a remediation action to ameliorate the root cause(s). In the illustrated example, the network diagnosis service 224 includes an input queue 606, an event handler 608 a model loader 610, and a smart event generator 612.

The input queue 606 receives the alerts 602 from the network devices 114 within the network 102 for processing. The event handler 608 selects an alert 602 from the input queue 606 (e.g., based on time in the queue and/or priority, etc.) and retrieves, via the model loader 610, the network diagnosis model 300, including the network model 302 and the diagnosis model 304, from the model database 216. In the illustrated example, the event handler 608 forms groups of related services, nodes, and/or resources based on the device-level modeled dependencies, the device-resource model dependencies, the service-to-resource modeled dependencies, the multi-layer services dependencies, and/or the dependencies with in service model (collectively, the "network diagnosis model dependencies"). The event handler 608 travels the network diagnosis model dependencies without the grouped services, nodes, and/or resources to determine the resource that is the root cause of the alert. The inference engine 226, based on, for example, the network diagnosis model dependencies and the cause and effect relationships associated with the alert 602 modeled in the diagnosis model 304, uses the event database 218 to determine what event caused the resource to failure in the manner that produced the alert. The smart event generator 612 generates the smart event 604 that identifies event. In some examples, the smart event generator 612 generates the smart event 604 to includes one or more actions to correct the identified event based on remediations actions stored in the telemetry database 220.

Figure 7:
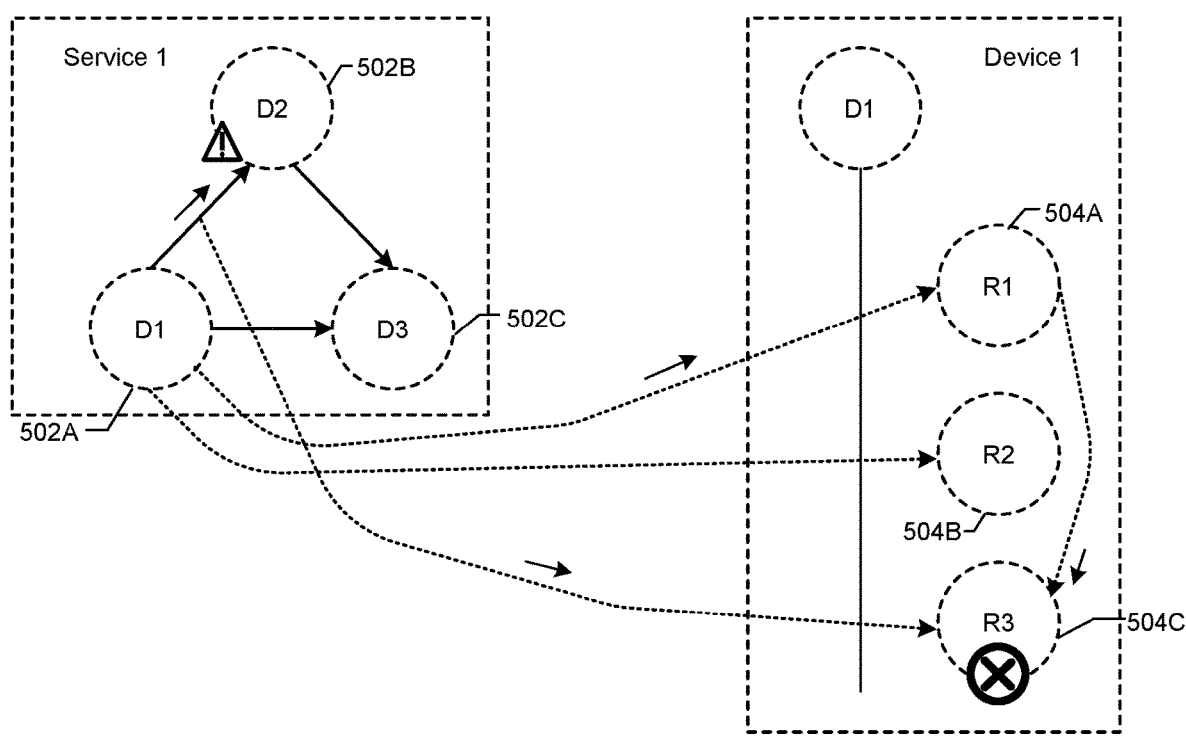
FIG. 7 illustrates a graphical example of following node, service, and multi-layer dependencies to arrive at the root cause of a failure.

FIG. 7 illustrates a graphical example of following node, service, and multi-layer dependencies to arrive at the root cause of a failure. In the illustrated example, a failure may be detected on D2 502B. Because D2 502B includes a link from D1 502A, the network diagnosis service 224 forms groups based on (a) the dependencies on that link and (b) the dependencies of D1 502A. The link has a dependency to node R1 504A. Additionally, D1 502A has a dependency on node R3 504C and node R1 504A has a dependency on node R3 504C. By traversing the related dependencies, the network diagnosis service 224 would identify an event on node R3 504C as being the source of the problem.

Figure 8:
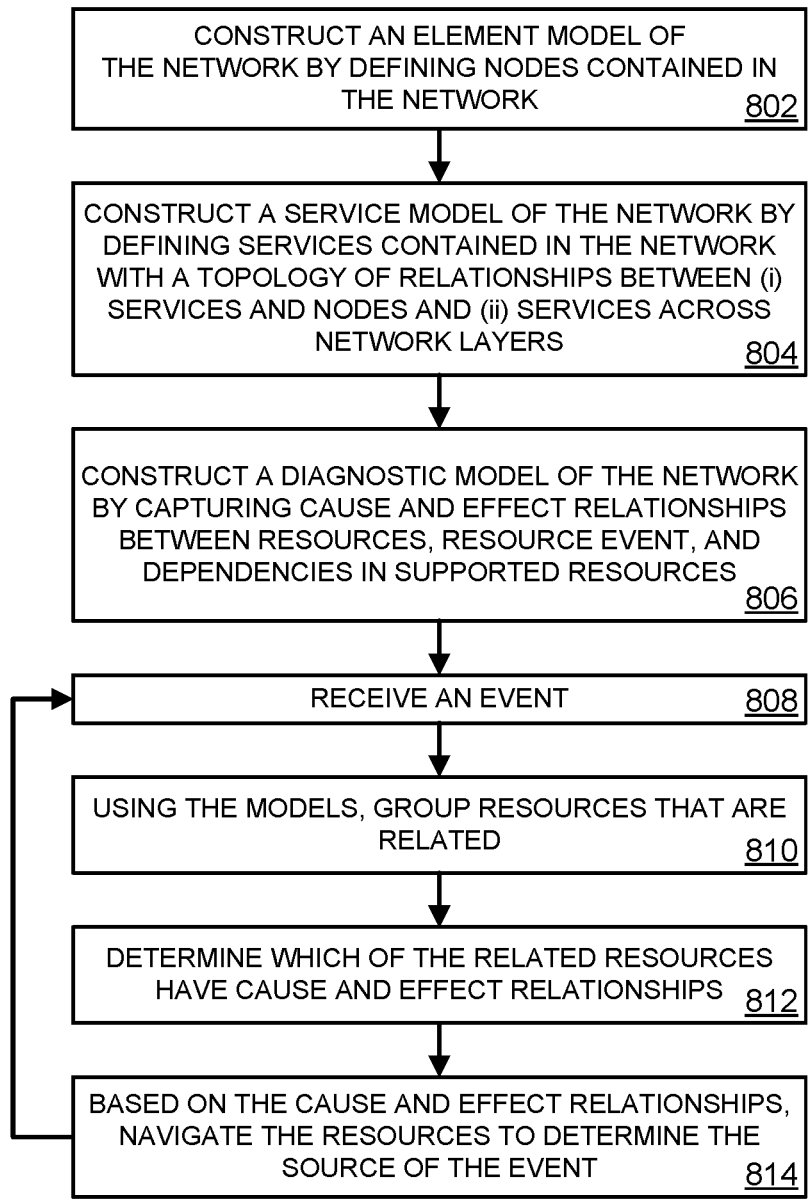
FIG. 8 is a flowchart of an example method to perform root cause analysis using a network aware diagnosis process, that may be implemented by the management device of FIGS. 1 and 2.

FIG. 8 is a flowchart of an example method to perform root cause analysis using the network aware diagnosis model 300, that may be implemented by the management device 110 of FIGS. 1 and 2. Initially, the configuration module 222 constructs an element model of the network by defining nodes contained in the network (block 802). The configuration module 222 constructs a service model of the network by defining services contained in the network with a topology of relationships (e.g., links, dependencies, etc.) between (i) services and nodes and (ii) services across network layers (block 804). The configuration module 222 constructs a diagnosis model of the network by capturing cause and effect relationships between resources, resource event, and dependencies in supported resources (block 806).

From time-to-time, the network diagnosis service 224 receives an alert 602 (block 808). Using the constructed models (e.g., the models constructed at blocks 802 to 806), the network diagnosis service 224 groups resources that are related (e.g., via links, via dependencies, etc.) (block 810). The network diagnosis service 224 determines which of the related resources have cause and effect relationships associated with the alert 602 (block 812). The network diagnosis service 224 performs root-cause-analysis by determining the source of an event related to the alert based on navigating the cause and effect relationships (block 814).

The techniques described in this disclosure may be implemented, at least in part, hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method to monitor a network comprising:
constructing, by a controller device that manages a plurality of network devices, a deployed graph model comprising a plurality of models representative of services operating on the network devices within the network, the plurality of models including 1) a device model representing the network devices and resources of the network devices, 2) a service model representing services provided by the network devices, a topology of relationships between the network devices, and which of the network devices is involved in each of the services, and 3) a diagnosis model representing cause-and-effect relationships between the resources and resource events;
storing, by the controller device, the deployed graph model including each of the plurality of models in memory of the controller device;
receiving an alert, by the controller device, that a service operating on one of the network devices is experiencing a failure;
traversing, by the controller device, modeled dependencies within the deployed graph model, including the device model, the service model, and the diagnosis model, to perform root cause analysis of the service that is experiencing the failure to determine a resource-level event causing the failure; and
based on the traversing, providing, by the controller device, a report indicating the root cause of the failure.

2. The method of claim 1, wherein the service model further represents multi-layer services including services that operate at multiple layers of a network.

3. The method of claim 1, wherein at least one of the plurality of models includes dependencies between the network devices, resources of the network devices, services operating on the network devices, and multi-layer services.

4. The method of claim 1, wherein at least one of the plurality of models includes dependencies between events associated with network devices, resources of the network devices, services operating on the network devices, and multi-layer services.

5. The method of claim 1, wherein traversing the modeled dependencies within the deployed graph model comprises:
grouping network components associated with the network device experiencing failure based on the modeled dependencies of those network components; and
traversing the modeled dependencies within the grouped network components until a resource of a network device that has no dependencies is reached.

6. The method of claim 1, wherein providing the report includes providing a recommendation to remediate the root cause of the failure.

7. The method of claim 1, further comprising automatically performing an action, by the controller device, to remediate the root cause of the failure.

8. A controller device to manage a plurality of network devices, the controller device comprising:
a memory; and
one or more processing units implemented in circuitry and configured to:
construct a deployed graph model comprising a plurality of models representative of services operating on the network devices within the network, the plurality of models including 1) a device model representing the network devices and resources of the network devices, 2) a service model representing services provided by the network devices, a topology of relationships between the network devices, and which of the network devices is involved in each of the services, and 3) a diagnosis model representing cause-and-effect relationships between the resources and resource events;
store the deployed graph model including each of the plurality of models in the memory;
receive an alert that a service operating on one of the network devices is experiencing a failure;
traverse modeled dependencies within the deployed graph model, including the device model, the service model, and the diagnosis model, to perform root cause analysis of the service that is experiencing the failure to determine a resource-level event causing the failure; and
based on the traversing, provide a report indicating the root cause of the failure.

9. The controller device of claim 8, wherein the service model further represents multi-layer services including services that operate at multiple layers of a network.

10. The controller device of claim 8, wherein at least one of the plurality of models includes dependencies between the network devices, resources of the network devices, services operating on the network devices, and multi-layer services.

11. The controller device of claim 8, wherein at least one of the plurality of models includes dependencies between events associated with network devices, resources of the network devices, services operating on the network devices, and multi-layer services.

12. The controller device of claim 8, wherein to traverse the modeled dependencies within the deployed graph model, the one or more processing units are configured to:
group network components associated with the network device experiencing failure based on the modeled dependencies of those network components; and
traverse the modeled dependencies within the grouped network components until a resource of a network device that has no dependencies is reached.

13. The controller device of claim 8, wherein to provide the report, the one or more processing units are configured to provide a recommendation to remediate the root cause of the failure.

14. The controller device of claim 8, where the one or more processing units are further configured to automatically perform an action to remediate the root cause of the failure.

15. A controller device to manage a plurality of network devices, the controller device comprising:
a memory; and
one or more processing units implemented in circuitry and configured to:
construct a deployed graph model comprising a plurality of models, the plurality of models including 1) a device model representing the network devices, resources of the network devices, and modeled dependencies between the network devices, 2) a service model representing services operating on the network devices including multi-layer services that operate at multiple layers of a network, a topology of relationships between the network devices, and which of the network devices is involved in each of the services, and 3) a diagnosis model representing cause-and-effect relationships between the resources and resource events;

store the deployed graph model in the memory;

receive a plurality of alerts representing multiple failures of one or more of the services operating on the network devices;

traverse the modeled dependencies within the deployed graph model, including the device model, the service model, and the diagnosis model, to perform root cause analysis; and based on the traversing, provide a report indicating the root causes of the failures.

16. The controller device of claim 15, wherein to provide the report, the one or more processing units are configured to provide a recommendation to remediate the root cause of the failure.

17. The controller device of claim 15, where the one or more processing units are further configured to automatically perform an action to remediate the root cause of the failure.

18. The controller device of claim 15, wherein traverse the modeled dependencies within the deployed graph model to perform root cause analysis, the one or more processing units are configured to:

group network components associated with the network device experiencing failure based on the modeled dependencies of those network components; and traverse the modeled dependencies within the grouped network components until a resource of a network device that has no dependencies is reached.

19. The method of claim 1, wherein constructing the deployed graph model comprises constructing the deployed graph model from an intent data model.

* * * * *